E. E. GOLD.
STEAM HEATING SYSTEM.
APPLICATION FILED NOV. 6, 1911.

1,106,801.

Patented Aug. 11, 1914.

3 SHEETS—SHEET 1.

WITNESSES:
René Bruine
Fred White

INVENTOR
Edward E. Gold,
By Attorneys,
Fraser Turkommyers

E. E. GOLD.
STEAM HEATING SYSTEM.
APPLICATION FILED NOV. 6, 1911.
1,106,801.
Patented Aug. 11, 1914.
3 SHEETS—SHEET 2.
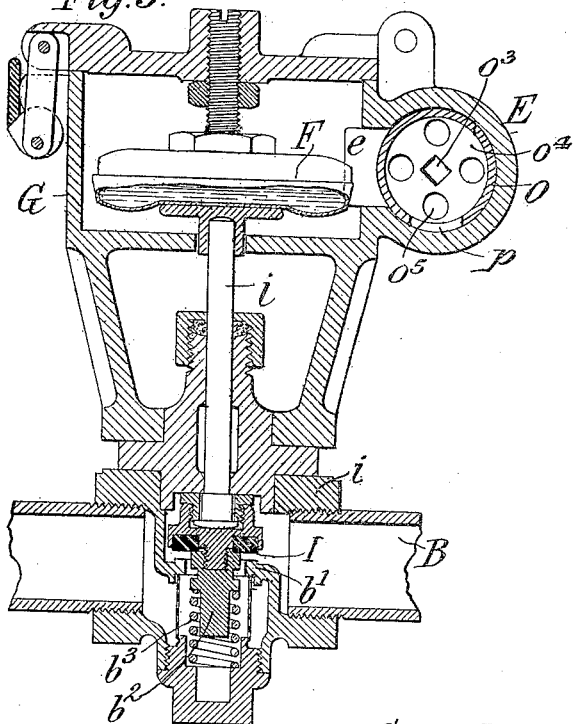
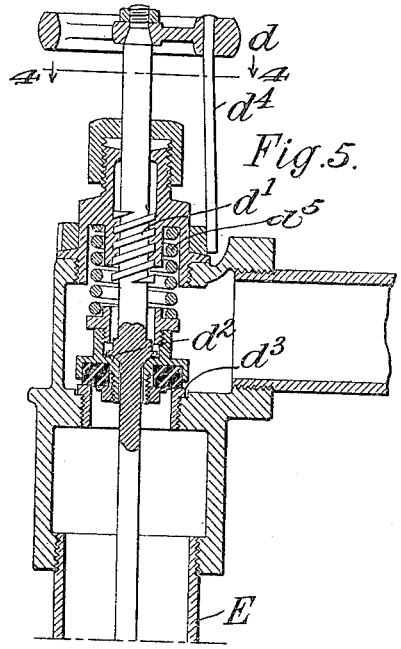
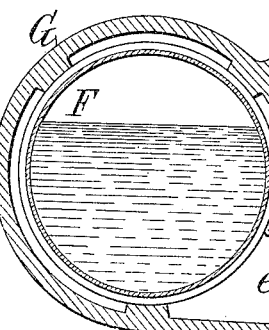
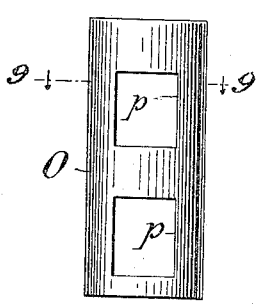
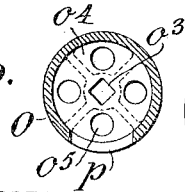
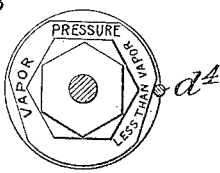
WITNESSES:
René Bruine
Fred White
INVENTOR:
Edward E. Gold,
By Attorneys,
Fraser, Turk & Myers

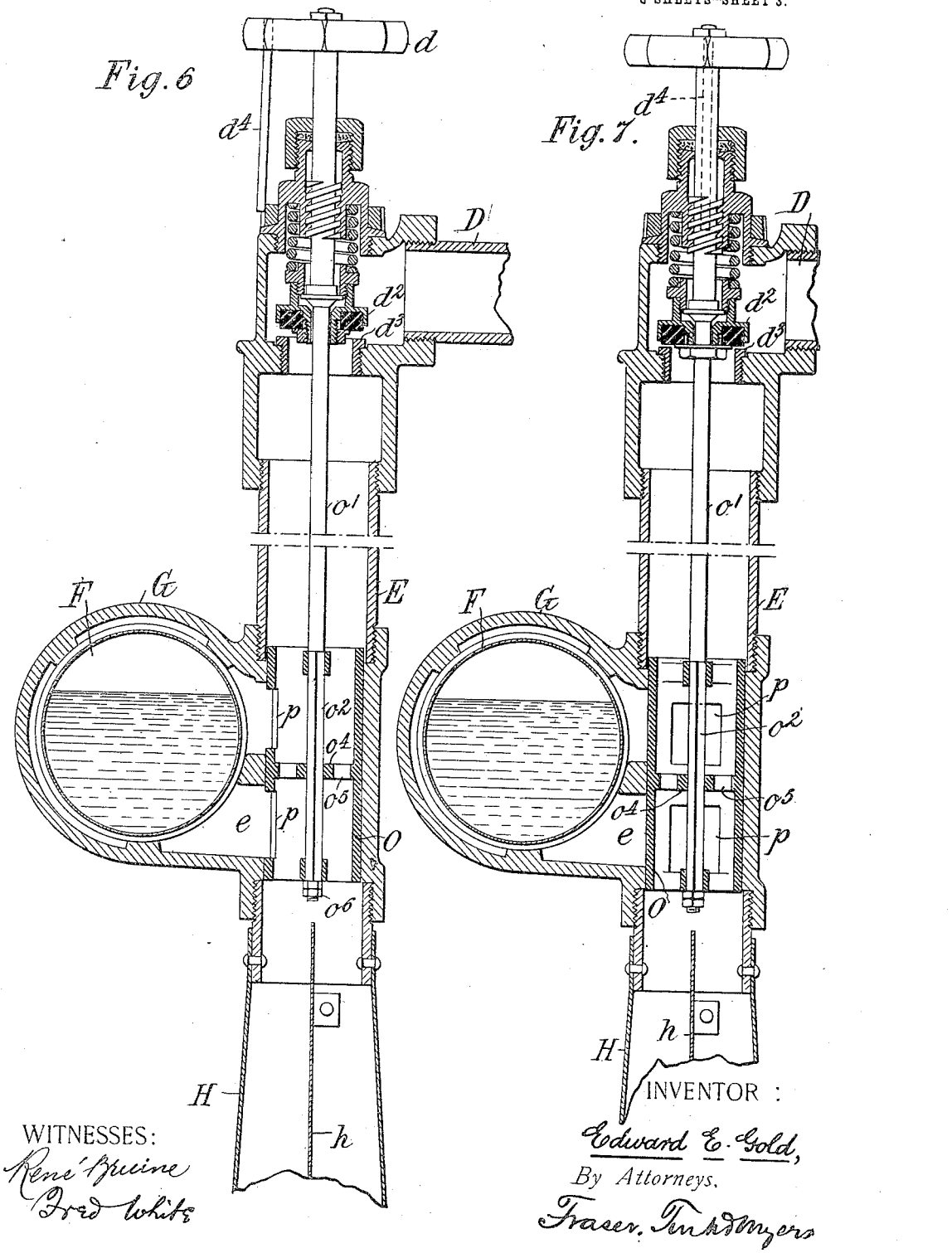

UNITED STATES PATENT OFFICE.

EDWARD E. GOLD, OF NEW YORK, N. Y., ASSIGNOR TO GOLD CAR HEATING & LIGHTING COMPANY, OF NEW YORK, N. Y., A CORPORATION OF NEW YORK.

STEAM-HEATING SYSTEM.

1,106,801. Specification of Letters Patent. Patented Aug. 11, 1914.

Application filed November 6, 1911. Serial No. 658,662.

*To all whom it may concern:*

Be it known that I, EDWARD E. GOLD, a citizen of the United States, residing in the borough of Manhattan, city, county, and State of New York, have invented certain new and useful Improvements in Steam-Heating Systems, of which the following is a specification.

My invention relates to steam heating systems and is particularly adapted for steam heating systems for use in heating railway passenger cars. Hitherto such systems have been devised which were adapted to furnish two degrees of heat, to wit, a high degree when operating as a pressure system and receiving the full pressure of the steam from the supply pipe, and a less degree of heat when operating as a vapor system wherein the pressure in the radiators is substantially atmospheric pressure.

It is greatly to be desired frequently to heat the pipes at a very moderate degree of heat which shall be less than the heat radiated when operating as a vapor system. Particularly is this true in heating passenger cars which start in the early morning when the temperature is very low, but which, as the day proceeds and the sun becomes high, encounter temperatures where the heat radiated from the radiating pipes, even when acting as a vapor system, is so great as to be uncomfortable.

My present invention therefore aims to provide means whereby the system may be operated at a third degree of heat which shall be less than the vapor heat, and which consists in the provision of means whereby this object is accomplished as hereinafter fully described.

Figure 1:
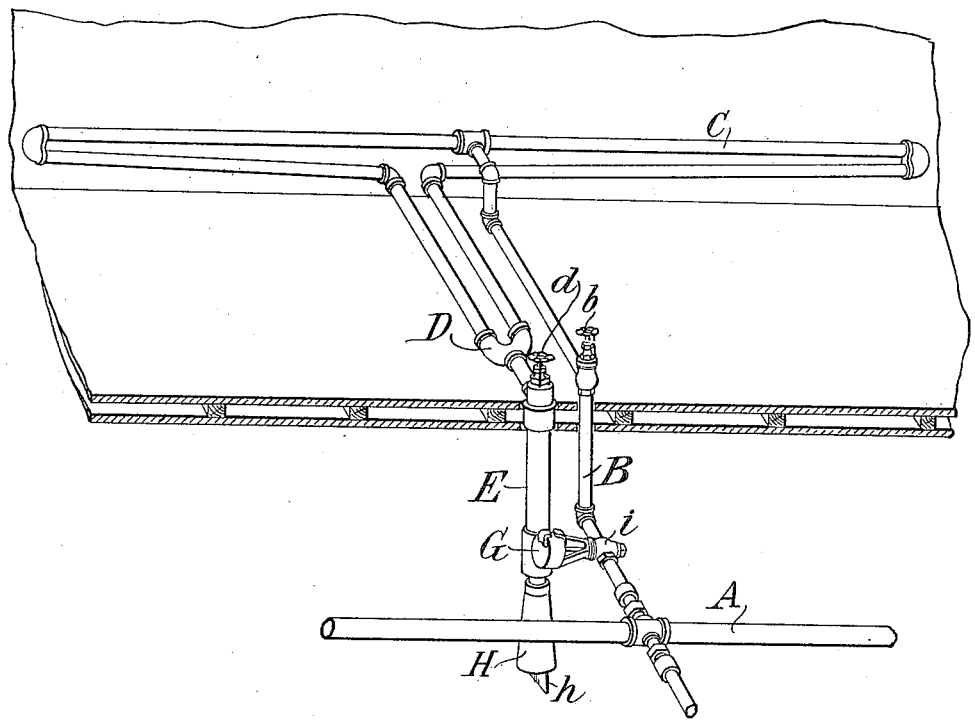
Figure 2:
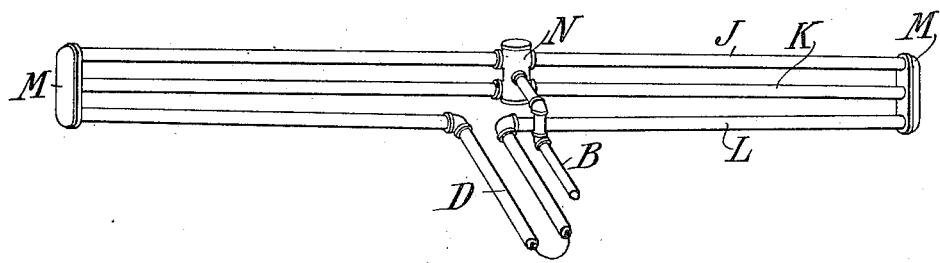

In the accompanying drawings a desirable form in which my invention may be embodied is illustrated. Here Figure 1 illustrates in perspective view a steam car heating system embodying my invention. Fig. 2 is a similar view illustrating the employment of a greater number of radiating pipes. Fig. 3 is a horizontal section through the thermostat and valve in the supply pipe controlled thereby, and Fig. 4 is a detail horizontal sectional view of a valve in the return pipe approximately on the line 4—4 of Fig. 5. Figs. 5, 6 and 7 are longitudinal sections through the valve and drip pipe. Fig. 8 is a detail view of a damper used with said modification. Fig. 9 is a sectional view of said damper on the line 9—9 of Fig. 8.

My invention is illustrated as applied to a system wherein steam is obtained from the train-pipe A which communicates with the locomotive boiler and is supplied through pipe B to the radiating system C in the cars, whence the water of condensation passes out through return pipe D and drip pipe E. The supply pipe B is provided with a valve $b$ shown as hand-operated and which is located within the car. This valve is preferably distinguished from the valve $d$ in return pipe D as for instance by painting the same red and painting the said return pipe valve black. The supply valve $b$ is hand-operated and controls the supply of steam to the radiators C. Outlet valve $d$ is also illustrated as being hand-operated and is the blow-off valve and prevents the passage of the condensation water through the return pipes when it is closed. Adjacent the drip pipe E is a thermostat F which is located within a casing G and in open communication with the said drip pipe through a passage $e$. The lower end of the drip pipe E terminates in the usual horn H through which the water of condensation passes and which may well be supplied with a ventilating or baffle plate $h$ adapted to direct a current of air toward the thermostat to render the same energetic in action. The said thermostat F is of usual construction and it contains a volatile fluid adapted to vaporize at comparatively low temperature and to expand the said thermostat.

An automatically operating valve I is located within a valve casing $i$ in the supply pipe B and is attached to a stem $i^1$ which in turn is connected to the thermostat F. The said valve is seated against a valve seat $b^1$ in the supply pipe and has an extension $b^2$ around which is situated a coiled spring $b^3$ which is seated within the valve casing $i$ and tends normally to maintain the valve I in open position. It will be observed that the thermostat F is located at one side of the drip pipe E, which affords a free passage for the water of condensation through said drip pipe, and therefore that the said thermostat will not be affected by the passage of water of condensation through the said pipe. It will, however, be affected upon the passage of steam therethrough and will immediately expand, closing the valve I and shutting off steam to the radiating system.

The valve $d$ is of usual construction and has a quick-acting thread $d^1$ by which the valve proper $d^2$ is raised or seated against its seat $d^3$ in the said drip pipe. The said valve preferably carries a pointer $d^4$ which by its position adjacent to locations designated "Less than vapor", "Vapor", or "Pressure", Fig. 4, indicates the proper position of the said valve for heating the car at these three different degrees of heat. A coiled spring $d^5$ surrounds the stem of the valve and takes up any lost motion when the valve is open.

In operating my system it may be assumed that the heating system is operating as a vapor system, with the supply valve $b$ open wide and with the valve $d$ in the return pipe turned so that its pointer is opposite the word "Vapor." The valve proper $d^2$ will then be in position indicated in Fig. 6, wherein a substantial amount of steam will flow past the said valve. This will tend to expand the thermostat F and in turn will close the automatic valve I in the supply pipe. If now it is desired to increase the supply of heat the valve $d$ will be turned so that its pointer comes opposite "Pressure" and the valve proper $d^2$ will then be in the position indicated in Fig. 7. Here the opening is so slight as to afford room for the passage only of the water of condensation which will flow past the thermostat and through the drip openings $o^5$ in the plate $o^4$ without affecting the thermostat. The system will then continue to operate as a pressure system. If then it is desired to operate at less than vapor heat the valve $d$ will be turned to the position "Less than vapor" where the valve proper $d^2$ will be completely closed against its seat $d^3$, Fig. 5. The water of condensation will then collect in the return pipe D and in the radiators C until the same is on a level with the coupling by which the supply pipe B is connected to the said radiator pipe. Any slight condensation above that point will flow into the steam pipe and be again vaporized and the steam, being in contact with the water, will prevent the same becoming too cold. At the same time the water as it cools will descend into the lower branches of the radiator and return pipe and will effect a decided lowering in temperature of the said pipes. I have found that with a pressure of 40 pounds with the said valve $d$ closed and the supply valve $b$ open, a temperature of 275° in the steam pipe will be accompanied by a temperature of 140° in the lower part of the radiator and even lower at the end of such pipe which is filled with water of condensation and with a like temperature in the return pipe D. It will be perceived, therefore, that a decided lowering of the radiated heat has been produced and a considerable saving of steam has been effected. The system, therefore, as above described, is simple in use, furnishes a wider range of heat than any other system with which I am acquainted, and is decidedly economical in its consumption of steam.

The said system is, of course, not limited in its application to the simple radiating system C illustrated in Fig. 1, but may be used in connection with a large number of radiating systems. For instance, as shown in Fig. 2, a radiating system composed of three longitudinal pipes J, K, L is illustrated. These pipes are connected at both ends to manifolds M. The two upper branches are joined by a header N to which the supply pipe B is connected, and the lower branch L is connected to the return pipe D. The location of valves $b$, $d$, drip E, thermostat F, horn H and valve I will be the same as in Fig. 1. In this arrangement of radiating pipes it will be seen that the water of condensation, when the system is adjusted to work at less than vapor heat, will collect in the radiating system to substantially the level of the socket in the header N to which the supply pipe B is connected.

The baffle plate $h$ which has been mentioned above, forms no part of the present invention. In use, however, it is designed to direct a current of air upwardly through the horn H, whence it passes around the thermostat F and quickly cools the same as soon as steam no longer flows upon the said thermostat, and tends therefore to make the same extremely energetic in its action.

In Figs. 5, 6 and 7 there is shown a damper O (Fig. 8) in the form of a sleeve which is located within the horn H adjacent the passage $e$ and has openings $p$ which are adapted to open communication from the drip pipe to said passage. The valve $d$ has an extended stem $o^1$ which has a squared end $o^2$ entering a squared perforation $o^3$ in plate $o^4$ and secured to said damper O by nuts $o^6$ so that said damper will turn as the valve is turned and will slide in the pipe E as the valve rises. Plate $o^4$ is perforated at $o^5$ to permit the passage of the water of condensation. The said parts are so arranged that when the valve $d$ is closed no drip will take place. When the said valve is opened slightly as in Fig. 7 to permit the condensed water to pass, the turning of the stem and damper is insufficient to uncover the passage $e$ to the thermostat F, and the said thermostat will be screened by said damper from the condensed steam. When the valve $d$ is opened more fully as in Fig. 6, the damper O will uncover the passage $e$ and the escaping steam will affect the thermostat F.

The particular manner of operating the damper is unimportant and it may be in numerous ways.

It is not to be inferred by reason of the particularity with which I have described all features of the foregoing invention that I regard my invention as necessarily limited to the employment of such details, as the particular construction illustrated may be changed and other devices substituted within the limits of the appended claims.

What I claim is:—

1. A car heating system having an automatic admission valve, a thermostat adapted to be heated by the discharge and controlling said admission valve, means for cutting off the discharge entirely or for limiting it sufficiently to permit the escape of only the water of condensation, and a damper adapted to prevent access of the heating medium to said thermostat when said means is operative to cut off or limit the discharge as stated.

2. A steam car heating system, provided with radiators, a supply pipe and a return pipe, an automatically operated valve in said supply pipe, a valve adapted to close said return pipe and having two open positions, one permitting a free discharge and the other a restricted discharge, thermostatically operated means controlled by the temperature in said return pipe and adapted to control the valve in said supply pipe, and a damper operated simultaneously with said return-pipe valve and adapted to permit access of the heating medium to said thermostat in the free-discharge position of the valve, and to prevent access thereto in the restricted-discharge position of the valve.

3. A steam car heating system, provided with radiators, radiating pipes, a supply pipe and a return pipe, an automatically operated valve in said supply pipe, a hand-operated valve adapted to close said return pipe and having two open positions, one permitting a free discharge and the other a restricted discharge, a thermostat in communication with said return pipe and controlled by the temperature therein, means operated by said thermostat for controlling the valve in said supply pipe, and a damper operated simultaneously with said return-pipe valve and adapted to permit access of the heating medium to said thermostat in the free-discharge position of the valve, and to prevent access thereto in the restricted-discharge position of the valve.

4. A steam car heating system comprising radiating pipes, a supply pipe, a return pipe and a drip pipe open to the atmosphere, an automatically operated valve in said supply pipe, and a valve adapted to close said return pipe and having two open positions, one permitting a free discharge and the other a restricted discharge, a thermostat in communication with said drip pipe, and controlled by the temperature therein, means connected thereto for operating the valve in said supply pipe, and a damper operated simultaneously with said return-pipe valve and adapted to permit access of the heating medium to said thermostat in the free-discharge position of the valve and to prevent access thereto in the restricted-discharge position of the valve.

In witness whereof, I have hereunto signed my name in the presence of two subscribing witnesses.

EDWARD E. GOLD.

Witnesses:
HENRY M. TURK,
THOMAS F. WALLACE.

---

Copies of this patent may be obtained for five cents each, by addressing the "Commissioner of Patents, Washington, D. C."